United States Patent
Shimizu et al.

(10) Patent No.: US 7,822,297 B2
(45) Date of Patent: Oct. 26, 2010

(54) OPTICAL MODULATOR

(75) Inventors: Ryo Shimizu, Chiyoda-ku (JP); Takahisa Fujita, Chiyoda-ku (JP); Toru Sugamata, Chiyoda-ku (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 404 days.

(21) Appl. No.: 12/084,494

(22) PCT Filed: Oct. 31, 2006

(86) PCT No.: PCT/JP2006/321717

§ 371 (c)(1),
(2), (4) Date: May 2, 2008

(87) PCT Pub. No.: WO2007/052638

PCT Pub. Date: May 10, 2007

(65) Prior Publication Data

US 2009/0252500 A1    Oct. 8, 2009

(30) Foreign Application Priority Data

Nov. 2, 2005    (JP) .............................. 2005-319139

(51) Int. Cl.
*G02F 1/01*    (2006.01)
*H04B 10/04*    (2006.01)
(52) U.S. Cl. .................. 385/2; 385/1; 385/14; 398/183
(58) Field of Classification Search .............. 385/1, 385/2, 3, 4, 8, 9, 40, 41, 42, 129, 130, 131, 385/132, 14; 398/183
See application file for complete search history.

(56) References Cited

U.S. PATENT DOCUMENTS

| 6,741,379 | B2 |   | 5/2004  | Kaitoh et al. |
|-----------|----|---|---------|---------------|
| 7,224,174 | B1 | * | 5/2007  | Malendevich et al. ........ 324/758 |
| 7,386,198 | B2 | * | 6/2008  | Ohmori et al. ................. 385/14 |
| 7,668,409 | B2 | * | 2/2010  | Sugiyama ....................... 385/3 |
| 2006/0051011 | A1 | * | 3/2006 | Ohmori et al. ................. 385/14 |
| 2008/0247708 | A1 | * | 10/2008 | Ohmori et al. ................. 385/14 |
| 2009/0252500 | A1 | * | 10/2009 | Shimizu et al. ............. 398/183 |

FOREIGN PATENT DOCUMENTS

| JP | 2003-188827 A | 7/2003 |
| JP | 2003-233043 A | 8/2003 |
| JP | 2003-348022 A | 12/2003 |

* cited by examiner

*Primary Examiner*—Brian M Healy
(74) *Attorney, Agent, or Firm*—Chapman and Cutler LLP

(57) ABSTRACT

It is an object of the invention to provide an optical modulator in which a connection substrate or a terminal substrate is disposed outside an optical modulation element and which can maintain at a proper voltage amplitude value a modulation signal applied to an optical modulation element. An optical modulator includes: a substrate having electro-optic effect; an optical waveguide formed on the substrate; an optical modulation element 1 having a modulation electrode (which includes a signal electrode 2) for modulating light passing through the optical waveguide; and a connection substrate 20 disposed outside the substrate to supply a modulation signal for driving the optical modulation element to the optical modulation element. In the optical modulator, a signal line for propagating the modulation signal is formed on the connection substrate, and a modulation signal monitoring output line 25 for monitoring the voltage amplitude of the modulation signal is provided right in front of an end of the signal line for supplying the modulation signal from the signal line to the optical modulation element.

6 Claims, 3 Drawing Sheets

(a)

(b)

US 7,822,297 B2

OPTICAL MODULATOR

TECHNICAL FIELD

The present invention relates to an optical modulator, and particularly, to an optical modulator having a connection substrate or a terminal substrate disposed outside an optical modulation element.

BACKGROUND ART

Conventionally, in optical communication and optical measurement fields, there has been broadly used a waveguide modulator in which an optical waveguide and modulation electrodes are formed on a substrate having electro-optic effect. In such an optical modulator, there are demanded multi functionalization and compact in size. In addition, as shown in FIG. 1, there has been used a method in which a connection substrate 4 and a terminal substrate 9 are disposed around the optical modulation element 1, and are integrally mounted in a casing 10, and thus an optical modulator module is formed.

In an example of the optical modulator shown in FIG. 1, an optical modulation element 1 is formed of an optical waveguide (not shown in the drawings) and a modulation electrode on a substrate made of $LiNbO_3$ and the like having electro-optic effect. The modulation electrode is constituted of a signal electrode 2, a ground electrode (not shown in the drawings), and the like. To the optical modulation element 1, an optical fiber 3 for emitting and receiving a light wave is connected.

In addition, a connection substrate 4 including a functional element 8 such as an amplifier and a terminal substrate 5 including terminator 9 are disposed around the optical modulation element 1. The connection substrate 4 and the terminal substrate 5 are encased in a casing 10 with the optical modulation element 1, and constitute the optical modulator module.

Hereinafter, a method for driving the optical modulator will be described. A microwave signal generated from a modulation signal source 6 is inputted to a GPO connector 7 serving as an input terminator of the casing 10, and is propagated from the connector to a signal input end 11 of the connection substrate 4 shown in FIG. 1(b).

In the connection substrate 4, modulation signals of an amplifier, a distributor, a phase shifter, and the like are outputted to a signal output end 12 through the functional element 8 for converting the modulation signal into various states. In addition, the connection substrate 4 is not limited to include the functional element 8, and as disclosed in Patent Document 1, for example, the connection substrate may have only a coplanar line path.

Patent Document 1: Japanese Unexamined Patent Application Publication No. 2003-233043

A signal output end 12 of the connection substrate is wire bonded to an electrode pad of the signal electrode 2 of the optical modulation element, and the modulation signal output from the connection substrate 4 is propagated to the signal electrode 2. Then, a light wave propagated in the optical waveguide of the optical modulation element is optically modulated by the modulation signal propagated to the signal electrode 2.

On a terminal portion of the signal electrode 2, the other electrode pad is provided, the electrode pad is wire bonded to the end of the signal line of the terminal substrate in the same manner as described above. Hence, the modulation signal is further propagated from the signal electrode 2 to the terminal substrate 5, and is absorbed by the terminator 9 provided in the terminal substrate.

Meanwhile, when the optical modulation element modulates intensity of light, a modulation curve D (a curve illustrating light intensity variation I of the modulated light wave with respect to a voltage V applied to the optical modulation element) of the optical modulation element 1 is shown in FIG. 2. Hence, particularly, the modulation signal applied to the signal electrode 2 of the optical modulation element 1 is set to vary in the range from the top point at which light output is at the maximum to the bottom point at which light output is at the minimum as represented by the reference sign a shown in FIG. 2. Variation in light output at the time of applying the modulation signal a is represented by the reference sign A.

When the modulation signal is smaller than a predetermined amplitude value as shown in FIG. 2 (in a case of a modulation signal b), the light output thereof varies as the reference sign B, and becomes smaller than a predetermined amplitude value of light output. Therefore, S/N ratio deteriorates. In addition, when the modulation signal is larger than the predetermined amplitude value as shown in FIG. 2 (in a case of a modulation signal c), the light output thereof varies as the reference sign C, and becomes smaller than the predetermined amplitude value of light output. Therefore, S/N ratio deteriorates, and simultaneously a light output waveform thereof is distorted.

As described above, to stably maintain modulation characteristics of the optical modulation element, it is necessary to constantly maintain at a predetermined value the voltage amplitude value of the modulation signal applied to the optical modulation element.

However, generally, a modulation signal for driving the optical modulation element is about 5V, while the modulation signal output from the modulation signal source 6 is about 0.3V. Thus, there has been used a method of amplifying modulation signal by use of an amplifier. Accordingly, since amplification ratio of the amplifier varies with temperature variation in the optical modulator module or temperature difference between the inside and outside of the module, there has been caused a problem that the amplitude value of the modulation signal applied to the optical modulation element departs from the predetermined value.

In addition, when the various type functional elements such as an amplifier, a distributor, and a phase shifter are mounted on the connection substrate, operation characteristics of them vary depending on temperature variation. For example, there is a case of variation in an amplitude value of the modulation signal output from the functional element. Consequently, the amplitude value of the modulation signal applied to the optical modulation element departs from a predetermined value, thereby causing deterioration in modulation characteristics of the optical modulator such as deterioration in S/N ratio and distortion in waveform.

In addition, in the connection substrate 4 mounted in the optical modulator module, when a microwave signal, which is the modulation signal, is guided into the substrate, a radiation mode 13 of the microwave signal occurs in the signal input end 11, thereby causing the effect that a part of the modulation signal is radiated inside the connection substrate, as shown in FIG. 1(b). Hence, the voltage amplitude value of the modulation signal is varied, and thus it is difficult to apply to the optical modulation element the modulation signal having the predetermined amplitude value. Moreover, when the amplifier is mounted on the functional element 8, the modulation signal itself inputted to the amplifier varies. As a result, the modulation signal output from the amplifier becomes larger and departs from the predetermined amplitude value.

Besides, when monitoring means (not shown in the drawings) for monitoring the voltage amplitude value of the modulation signal is provided outside the optical modulator module of FIG. 1, the modulation signal of which the voltage amplitude value is monitored is inputted to the inside of the optical modulator module through the GPO connector 7. Hence, when the voltage amplitude of the modulation signal is reduced by connection loss in the connector 7, the voltage amplitude value of the modulation signal applied to the optical modulation element 1 is remarkably different from the voltage amplitude value of the modulation signal monitored by the monitoring means, and thus it is difficult to monitor the voltage amplitude value of the modulation signal with high accuracy. As might be expected, it is also the same in a case where the amplifier of the modulation signal is provided outside the optical modulator module.

DISCLOSURE OF THE INVENTION

Problem that the Invention is to Solve

The invention has been made in consideration of the problems mentioned above, and its object is to provide an optical modulator in which a connection substrate or a terminal substrate is disposed outside an optical modulation element and which can maintain at a proper voltage amplitude value a modulation signal applied to an optical modulation element.

Means for Solving the Problems

According to a first aspect of the present invention, an optical modulator includes: an optical modulation element including a substrate having electro-optic effect, an optical waveguide formed on the substrate, and a modulation electrode for modulating light passing through the optical waveguide; and a connection substrate disposed outside the substrate to supply a modulation signal for driving the optical modulation element to the optical modulation element. In the optical modulator, a signal line for propagating the modulation signal is formed on the connection substrate, and a modulation signal monitoring output line for monitoring the voltage amplitude of the modulation signal is provided right in front of an end of the signal line for supplying the modulation signal from the signal line to the optical modulation element.

In the invention, "right in front of an end of the signal line" means a position between a functional element and the end of the signal line in a case where the functional element is disposed on the connection substrate, or any position on the signal line in a case where the functional element is not provided.

According to a second aspect of the present invention, the optical modulator according to the first aspect is characterized in that a functional element for converting the modulation signal into various states is disposed on the signal line, and the modulation signal monitoring output line is disposed on a position for monitoring the voltage amplitude of the output modulation signal of the functional element.

In the invention, "a functional element for converting the modulation signal into various states" means an electric circuit element such as an amplifier, a phase shifter, or a distributor that has a function of converting a modulation signal state into a specific state by performing signal amplification/attenuation, phase adjustment, signal distribution/combination or the like on a modulation signal.

According to a third aspect of the present invention, an optical modulator includes: an optical modulation element including a substrate having electro-optic effect, an optical waveguide formed on the substrate, and a modulation electrode for modulating light passing through the optical waveguide; and a terminal substrate disposed outside the substrate to supply a modulation signal for driving the optical modulation element from the optical modulation element to a terminator. In the optical modulator, the terminal substrate is provided with the terminator, and a modulation signal monitoring output line for monitoring the voltage amplitude of the modulation signal inputted to the terminator.

According to a fourth aspect of the present invention, the optical modulator according to any one of the first aspect to the third aspect is enclosed in a casing.

ADVANTAGE OF THE INVENTION

According to the first aspect of the present invention, an optical modulator includes: an optical modulation element including a substrate having electro-optic effect, an optical waveguide formed on the substrate, and a modulation electrode for modulating light passing through the optical waveguide; and a connection substrate disposed outside the substrate to supply a modulation signal for driving the optical modulation element to the optical modulation element. In the optical modulator, a signal line for propagating the modulation signal is formed on the connection substrate, and a modulation signal monitoring output line for monitoring the voltage amplitude of the modulation signal is provided right in front of an end of the signal line for supplying the modulation signal from the signal line to the optical modulation element. Hence, it is possible to detect with high accuracy a voltage amplitude of the modulation signal applied to the optical modulation element, by monitoring the modulation signal applied to the optical modulation element just before the application. In addition, it is possible to maintain the voltage amplitude value of the modulation signal at a predetermined value, by controlling output of the modulation signal source and the amplifier on the basis of the result from the monitoring.

According to the second aspect of the present invention, a functional element for converting the modulation signal into various states is disposed on the signal line, and the modulation signal monitoring output line is disposed on a position for monitoring the voltage amplitude of the output modulation signal of the functional element. Hence, even when operation characteristics of the functional element are varied with temperature variation, it is possible to maintain the voltage amplitude value of the modulation signal, which is outputted from the functional element, at a predetermined value.

According to the third aspect of the present invention, an optical modulator includes: an optical modulation element including a substrate having electro-optic effect, an optical waveguide formed on the substrate, and a modulation electrode for modulating light passing through the optical waveguide; and a terminal substrate disposed outside the substrate to supply a modulation signal for driving the optical modulation element from the optical modulation element to a terminator. In the optical modulator, the terminal substrate is provided with the terminator, and a modulation signal monitoring output line for monitoring the voltage amplitude of the modulation signal inputted to the terminator. Hence, it is possible to detect with high accuracy a voltage amplitude of the modulation signal applied to the optical modulation element, by monitoring the modulation signal applied to the optical modulation element in a terminal portion of the signal electrode. In addition, it is possible to maintain the voltage amplitude value of the modulation signal at a predetermined value, by controlling output of the modulation signal source and the amplifier on the basis of the result from the monitoring.

According to the fourth aspect of the present invention, the optical modulator is enclosed in a casing. Hence, even when temperature difference occurs inside and outside the casing, it is possible to detect with high accuracy a voltage amplitude of the modulation signal applied to the optical modulation element, by the modulation signal monitoring output line of the connection substrate or the terminal substrate disposed in the casing. On the basis of the result from the monitoring, the modulation signal applied to the optical modulator module and various signals are controlled. Thus, it is possible to drive the optical modulation element by stably applying a proper modulation signal thereto.

DESCRIPTION OF REFERENCE NUMERALS AND SIGNS

1: OPTICAL MODULATION ELEMENT
2: SIGNAL ELECTRODE
3: OPTICAL FIBER
4, 20, 40: CONNECTION SUBSTRATE
5, 30: TERMINAL SUBSTRATE
6: MODULATION SIGNAL SOURCE
7, 23, 33: CONNECTOR
8: FUNCTIONAL ELEMENT
9: TERMINATOR
10: CASING
11: SIGNAL INPUT END
12: SIGNAL OUTPUT END
13: MICROWAVE RADIATION MODE
21, 41: AMPLIFIER
22, 31: EXTRACTING POINT OF MODULATION SIGNAL MONITORING OUTPUT LINE
24, 34: SIGNAL VOLTAGE DETECTOR
25, 35: MODULATION SIGNAL MONITORING OUTPUT LINE
32: SIGNAL LINE
50: BRANCH POINT
51, 52: RESISTOR

BEST MODE FOR CARRYING OUT THE INVENTION

Hereinafter, appropriate embodiments of the invention will be described.

Figure 3:
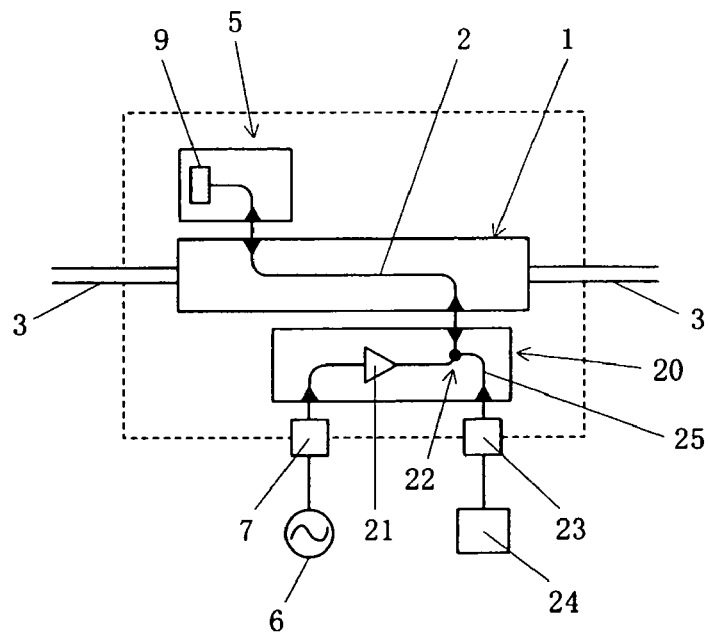
FIG. 3 is a view illustrating a first embodiment of an optical modulator according to the invention.

FIG. 3 is a view illustrating a first embodiment of an optical modulator according to the invention.

Figure 1:
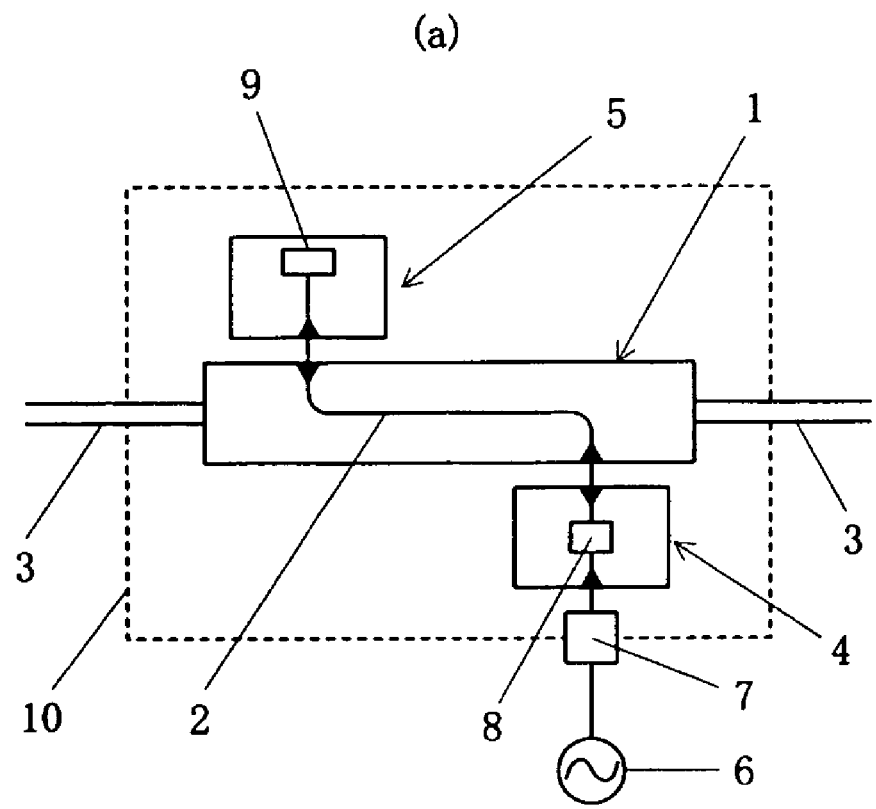
FIG. 1 is a schematic view illustrating a known optical modulator.
Figure 1:
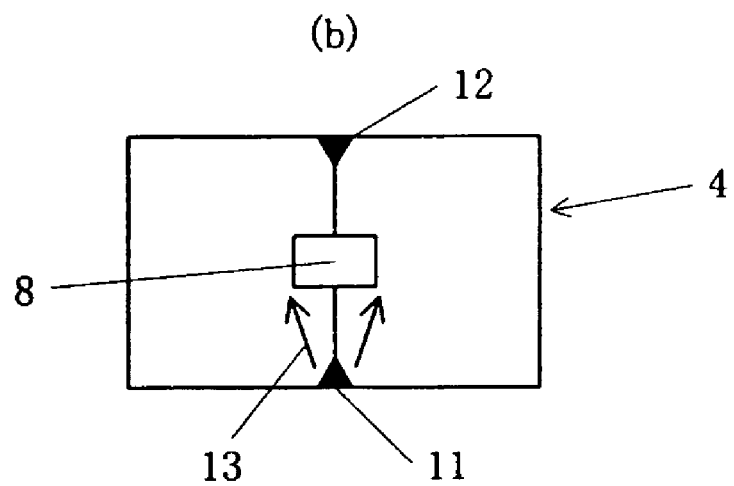
Figure 2:
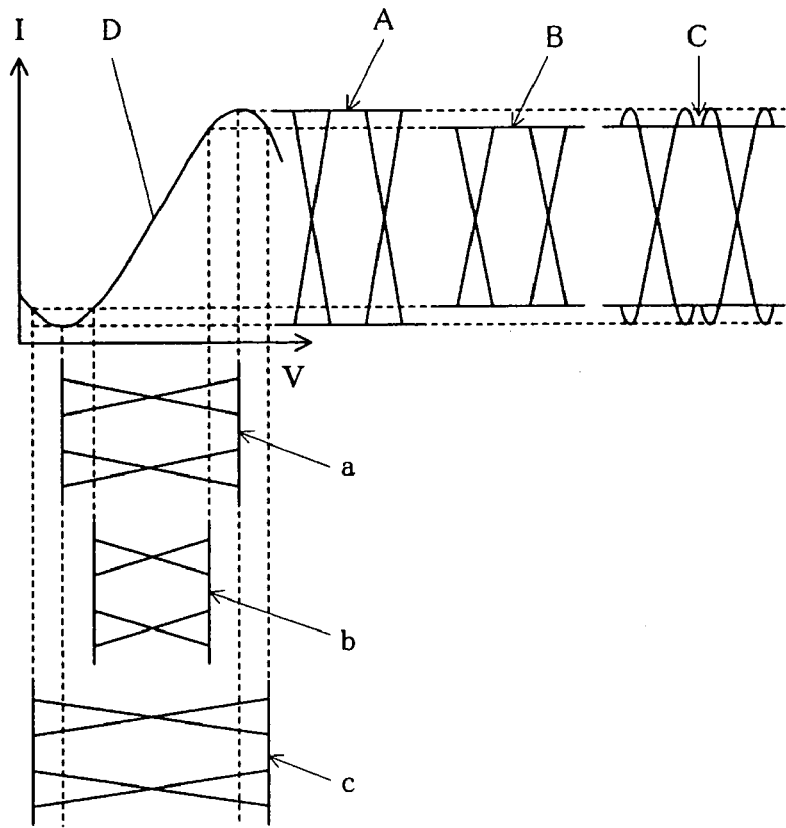
FIG. 2 is a view illustrating light output variation of a modulation signal in an optical modulation element.

In FIG. 3, the common elements referenced by the same reference numerals and signs as FIG. 1 have the same configuration as FIG. 1. In the invention, a material and a structure of an optical modulation element 1 are not limited if the optical modulation element has a substrate having electro-optic effect, an optical waveguide formed on the substrate, a modulation electrode for modulating light passing through the optical waveguide. However, exemplary materials of the substrate having electro-optic effect may include Lithium Niobate, Lithium Tantalate, PLZT (Lead Lanthanum Zirconate Titanate), and quarts based materials. In addition, the optical waveguide on the substrate may be formed by diffusing Ti and the like on a surface of the substrate in a thermal diffusion method, a proton-exchange method, or the like. Further, a signal electrode or a ground electrode constituting the modulation electrode may be formed by Ti/Au electrode patterning and gold plating method. In addition, it may be possible to provide a buffer layer made of a dielectric substance such as $SiO_2$ on the surface of the substrate after forming the optical waveguide as occasion demands.

Figure 5:
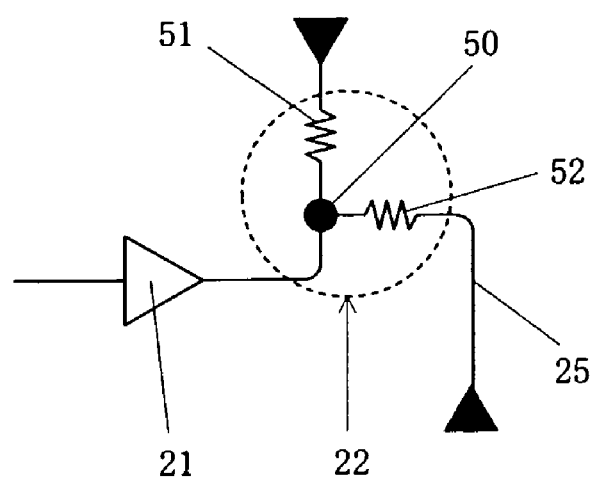
FIG. 5 is a view illustrating an example of an extracting point of a modulation signal monitoring output line.

In FIG. 3, the invention is characterized in that, in a signal line for propagating a modulation signal of a connection substrate 20, a modulation signal monitoring output line 25 for monitoring a voltage amplitude of the modulation signal is provided right in front of an end of the signal line for supplying the modulation signal from the signal line to the optical modulation element. An extracting point 22 of the modulation signal monitoring output line 25 includes a branch point 50, resistors 51 and 52, and the like, and is configured so as to apply a part of the modulation signal output from the amplifier 21 to the modulation signal monitoring output line 25, as shown in FIG. 5. In addition, the extracting point 25 of the modulation signal is not limited to the view shown in FIG. 5 if it is possible to measure a voltage of the modulation signal output to the optical modulation element without attenuation of the modulation signal, and may be configured by assembling various electric parts such as a resistor and a capacitor. In addition, it is preferred that the connection substrate 20 and a terminal substrate to be described later employs a low-dielectric loss material such as aluminum or aluminum nitride.

The signal of modulation signal monitoring output line 25 is inputted to a signal voltage detector 24 installed outside a casing 10 through the connector 23. For example, it may be possible to configure that output of the amplifier 21 is controlled to make a detected value of the signal coincide with a predetermined reference value by comparing them to each other.

In an embodiment in FIG. 3, the amplifier 21 is exemplarily shown as a functional element disposed on the connection substrate 20. However, the functional element of the invention is limited to the amplifier, and may use a distributor and a phase shifter. When it is difficult to change output of the modulation signal by controlling the functional element, it may be possible to directly control the amplifier (not shown in the drawings) and control a signal source 6 installed outside the optical modulator module so that the signal of the modulation signal monitoring output line reaches a predetermined value. As might be expected, it may be also possible to perform control operation in the same manner when the connection substrate is formed of only the signal line without the functional element.

As described above, it is possible to detect with high accuracy a voltage amplitude of the modulation signal applied to the optical modulation element configured so that adverse effects resulted from temperature variation, a radiation mode of a microwave signal, connection loss in a connector, and the like are suppressed, by using the modulation signal monitoring output line 25 in order to monitor the modulation signal applied to the optical modulation element just before the application. In addition, it is possible to maintain the voltage amplitude value of the modulation signal at a predetermined value, by controlling output of the modulation signal source and the amplifier on the basis of the result from the monitoring.

Figure 4:
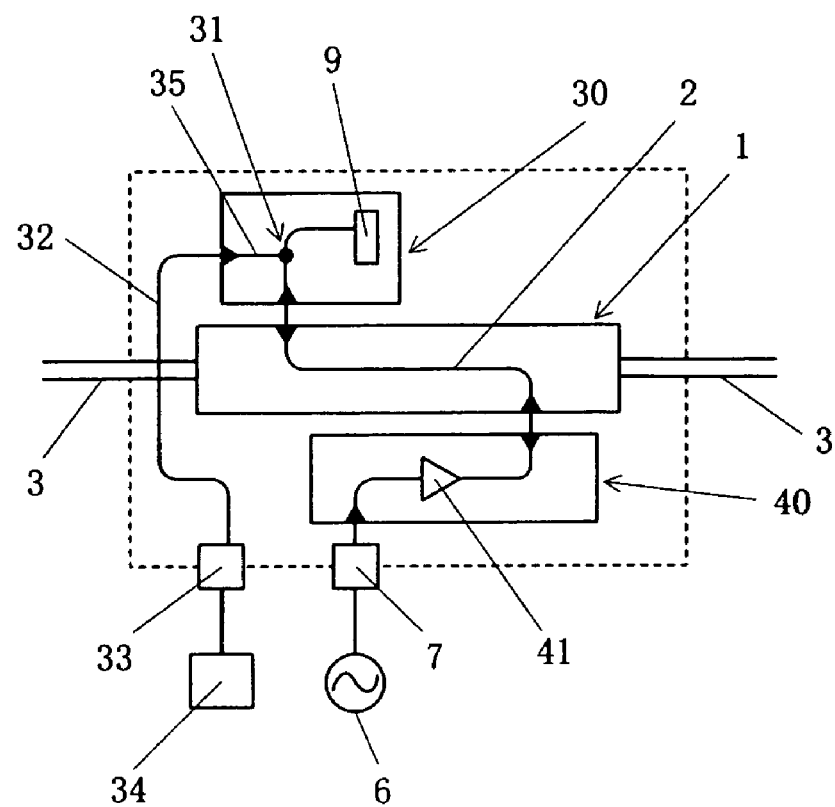
FIG. 4 is a view illustrating a second embodiment of an optical modulator according to the invention.

FIG. 4 is a view illustrating a second embodiment of an optical modulator according to the invention.

In FIG. 4, there is provided a modulation signal monitoring output line 35 for monitoring a voltage amplitude of a modulation signal applied to a terminator on a terminal substrate 30. The signal output from the modulation signal monitoring output line 35 is transmitted by a signal line 32 through the connector 33 to the outside of the optical modulator module, and is inputted to a signal voltage detector 34. In addition, an amplifier 41 is provided on a connection substrate 40. Further, an extracting point 31 of the modulation signal monitoring output line 35 may be configured the same as the circuit shown in FIG. 5.

As described above, it is possible to detect with high accuracy a voltage amplitude of the modulation signal applied to the optical modulation element configured so that adverse effects resulted from temperature variation, a radiation mode of a microwave signal, connection loss in a connector, and the like are suppressed, by using the modulation signal monitoring output line 35 in order to monitor the modulation signal applied to the optical modulation element in a terminal portion of the signal electrode. In addition, it is possible to maintain the voltage amplitude value of the modulation signal at a predetermined value, by controlling output of the modulation signal source and the amplifier on the basis of the result from the monitoring, as shown in FIG. 3.

In addition, the optical modulator is enclosed in a casing 10 as shown in FIGS. 3 and 4. Hence, even when temperature difference occurs inside and outside the casing, it is possible to detect with high accuracy a voltage amplitude of the modulation signal applied to the optical modulation element, by the modulation signal monitoring output lines 25 and 35 of the connection substrate 20 or the terminal substrate 30 disposed in the casing. On the basis of the result from the monitoring, the modulation signal applied to the optical modulator module and various signals are controlled. Thus, it is possible to drive the optical modulation element by stably applying a proper modulation signal thereto.

INDUSTRIAL APPLICABILITY

According to the invention as described above, it is possible to provide an optical modulator in which a connection substrate or a terminal substrate is disposed outside an optical modulation element and which can maintain at a proper voltage amplitude value a modulation signal applied to an optical modulation element.

The invention claimed is:

1. An optical modulator comprising:
    an optical modulation element including a substrate having electro-optic effect, an optical waveguide formed on the substrate, and a modulation electrode for modulating light passing through the optical waveguide; and
    a connection substrate disposed outside the substrate to supply a modulation signal for driving the optical modulation element to the optical modulation element,
    wherein a signal line for propagating the modulation signal is formed on the connection substrate, and
    wherein a modulation signal monitoring output line for monitoring the voltage amplitude of the modulation signal is provided right in front of an end of the signal line for supplying the modulation signal from the signal line to the optical modulation element.

2. The optical modulator according to claim 1,
    wherein a functional element for converting the modulation signal into various states is disposed on the signal line, and
    wherein the modulation signal monitoring output line is disposed on a position for monitoring the voltage amplitude of the output modulation signal of the functional element.

3. An optical modulator comprising:
    an optical modulation element including a substrate having electro-optic effect, an optical waveguide formed on the substrate, and a modulation electrode for modulating light passing through the optical waveguide; and
    a terminal substrate disposed outside the substrate to supply a modulation signal for driving the optical modulation element from the optical modulation element to a terminator,
        wherein the terminal substrate is provided with
            the terminator, and
            a modulation signal monitoring output line for monitoring the voltage amplitude of the modulation signal inputted to the terminator.

4. The optical modulator according to claim 1,
wherein the optical modulator is enclosed in a casing.

5. The optical modulator according to claim 2,
wherein the optical modulator is enclosed in a casing.

6. The optical modulator according to claim 3,
wherein the optical modulator is enclosed in a casing.

* * * * *